(12) United States Patent
Brødsgaard et al.

(10) Patent No.: US 10,480,486 B2
(45) Date of Patent: Nov. 19, 2019

(54) IMPROVEMENTS RELATING TO THE DETERMINATION OF ROTOR IMBALANCES IN A WIND TURBINE

(71) Applicant: VESTAS WIND SYSTEMS A/S, Aarhus N (DK)

(72) Inventors: Martin Brødsgaard, Hinnerup (DK); Thomas Krüger, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 300 days.

(21) Appl. No.: 15/503,629

(22) PCT Filed: Aug. 12, 2015

(86) PCT No.: PCT/DK2015/050234
§ 371 (c)(1),
(2) Date: Feb. 13, 2017

(87) PCT Pub. No.: WO2016/023556
PCT Pub. Date: Feb. 18, 2016

(65) Prior Publication Data
US 2017/0234300 A1 Aug. 17, 2017

(30) Foreign Application Priority Data
Aug. 13, 2014 (DK) .................................. 2014 70483

(51) Int. Cl.
F03D 7/04 (2006.01)
F03D 7/02 (2006.01)

(52) U.S. Cl.
CPC ......... F03D 7/0296 (2013.01); F03D 7/0224 (2013.01); F03D 7/046 (2013.01); F05B 2260/966 (2013.01); Y02E 10/723 (2013.01)

(58) Field of Classification Search
CPC ...... F03D 7/0296; F03D 7/046; F03D 7/0224; Y02E 10/723; F05B 2260/966
(Continued)

(56) References Cited

U.S. PATENT DOCUMENTS 4,420,692 A * 12/1983 Kos ................ F03D 7/0224
290/44
4,435,647 A * 3/1984 Harner ............ F03D 7/0224
290/44
(Continued)

FOREIGN PATENT DOCUMENTS

CA 2770668 A1 9/2012
CN 101221083 A 7/2008
(Continued)

OTHER PUBLICATIONS

Caselitz, P., et al: "Rotor Condition Monitoring for Improved Operational Safety of Off Shore Wind Energy Converters", Journal of Solar Energy Engineering, ASME International, US, vol. 127, No. 2, May 1, 2005, pp. 253-261.
(Continued)

Primary Examiner — J. Todd Newton
(74) Attorney, Agent, or Firm — Patterson + Sheridan, LLP

(57) ABSTRACT

A wind turbine comprising a tower, a rotor including a plurality of blades, an electrical generator operatively coupled to the rotor, and a control system including an active damping module configured to monitor oscillatory motion of the wind turbine and to output a damping demand signal to damp the oscillatory motion. The control system is configured to perform a rotor imbalance determination process including: controlling the rotating frequency of the rotor so that it substantially coincides with the natural frequency of the tower, determining rotor imbalance data based on the damping demand signal and evaluating said
(Continued)

rotor imbalance data to determine the presence of a rotor imbalance condition, and correcting the rotor imbalance condition by applying pitch control inputs to one or more of the plurality of blades so as to reduce the severity of the rotor imbalance. The invention may also be expressed as a method.

16 Claims, 5 Drawing Sheets

(58) Field of Classification Search
USPC .......................................................... 416/144
See application file for complete search history.

(56) References Cited

U.S. PATENT DOCUMENTS

| | | | | |
|---|---|---|---|---|
| 6,525,518 | B1* | 2/2003 | Garnaes | F03D 7/0296 |
| | | | | 324/207.12 |
| 7,400,055 | B2 | 7/2008 | Nagao | |
| 8,026,623 | B2* | 9/2011 | Wakasa | F03D 7/0224 |
| | | | | 290/44 |
| 8,096,762 | B2* | 1/2012 | Risager | F03D 7/0224 |
| | | | | 416/1 |
| 8,123,477 | B2* | 2/2012 | Risager | F03D 7/0224 |
| | | | | 416/1 |
| 8,186,949 | B2* | 5/2012 | Nielsen | F03D 7/0224 |
| | | | | 416/9 |
| 8,487,464 | B2* | 7/2013 | Skaare | F03D 7/0224 |
| | | | | 290/44 |
| 2006/0033338 | A1 | 2/2006 | Wilson | |
| 2008/0206051 | A1* | 8/2008 | Wakasa | F03D 7/0224 |
| | | | | 416/41 |
| 2008/0260514 | A1* | 10/2008 | Nielsen | F03D 7/0224 |
| | | | | 415/4.3 |
| 2009/0292397 | A1 | 11/2009 | Bjerge et al. | |
| 2010/0111693 | A1* | 5/2010 | Wilson | F03D 7/0224 |
| | | | | 416/1 |
| 2010/0119369 | A1* | 5/2010 | Risager | F03D 7/0224 |
| | | | | 416/1 |
| 2010/0187820 | A1* | 7/2010 | Wakasa | F03D 7/0224 |
| | | | | 290/44 |
| 2011/0204636 | A1 | 8/2011 | Scholte-Wassink et al. | |
| 2011/0316277 | A1* | 12/2011 | Skaare | F03D 7/0224 |
| | | | | 290/44 |
| 2012/0139740 | A1 | 6/2012 | Drossel et al. | |
| 2013/0177418 | A1* | 7/2013 | Hansen | F03D 7/0276 |
| | | | | 416/1 |
| 2013/0294911 | A1 | 11/2013 | Egedal | |
| 2016/0377058 | A1* | 12/2016 | Caponetti | F03D 7/0224 |
| | | | | 416/1 |
| 2017/0022972 | A1* | 1/2017 | Kj R | F03D 7/0224 |
| 2017/0234300 | A1* | 8/2017 | Brodsgaard | F03D 7/0224 |
| | | | | 416/1 |
| 2017/0241404 | A1* | 8/2017 | Kristoffersen | F03D 7/0224 |
| 2018/0363629 | A1* | 12/2018 | Kj R | F03D 9/255 |

FOREIGN PATENT DOCUMENTS

| | | |
|---|---|---|
| CN | 101586527 A | 11/2009 |
| CN | 102032110 A | 4/2011 |
| CN | 102338034 A | 2/2012 |
| CN | 102588213 A | 7/2012 |
| EP | 1959134 A2 | 8/2008 |
| EP | 2390501 A2 | 11/2011 |
| EP | 2565444 A1 | 3/2013 |
| EP | 2679808 A1 | 1/2014 |
| WO | 2008119351 A2 | 10/2008 |
| WO | WO-2008/119351 A2 * | 10/2008 ............ F03D 7/02 |

OTHER PUBLICATIONS

International Search Report for PCT/DK2015/050234, dated Nov. 20, 2015.
Danish Search Report for PA 2014 70483, dated Mar. 12, 2015.
Chinese Office Action for Application No. 201580049468.2 dated Aug. 23, 2018.

* cited by examiner

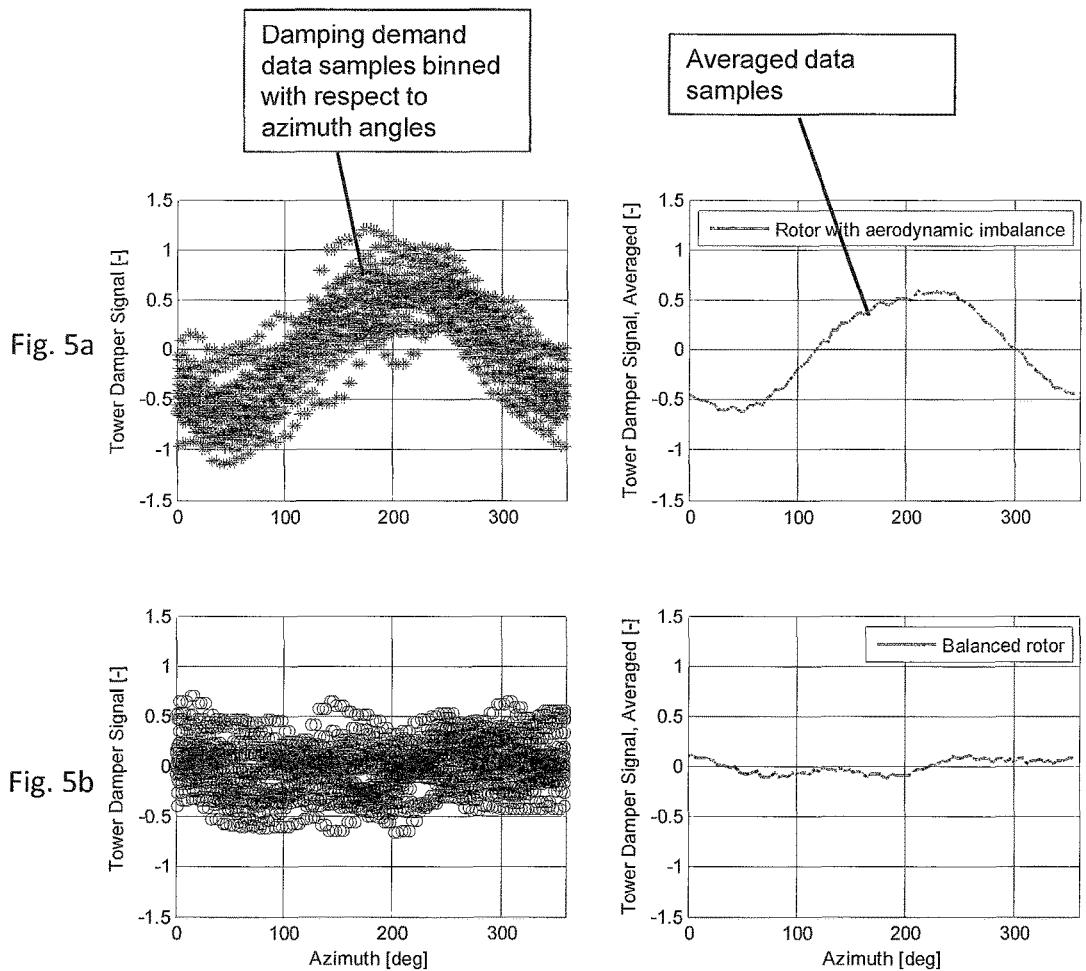
Fig. 5a
Fig. 5b
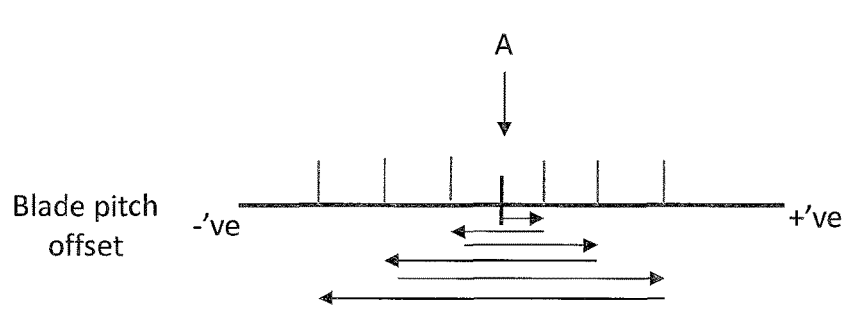
Fig. 6

IMPROVEMENTS RELATING TO THE DETERMINATION OF ROTOR IMBALANCES IN A WIND TURBINE

FIELD OF THE INVENTION

The present invention relates to a technique, strategy or process for determining imbalance in a rotor of a wind turbine.

BACKGROUND TO THE INVENTION

Wind turbines are being designed ever larger due to the economic and political incentives to increase energy production from renewable resources.

As the overall size of wind turbines increase, so too do the forces experienced by the wind turbines in operation. One significant factor in tower loading is the force generated due to the motion of the rotor mounted to the nacelle of the wind turbine. In ideal circumstances, the rotor would be balanced so as to minimise the forces applied to the tower by this source of excitation. However, in practice, the rotor generates cyclical forces on the tower due to two principle causes: aerodynamic imbalance and mass imbalance. Aerodynamic imbalance can occur when the aerodynamic properties of the blades are affected, for example when one or more of the blades are mounted incorrectly, when one blade is dirtier than the others, or when ice-build up on one of the blades is more severe. Aerodynamic imbalance can also occur when turbulent regions of airflow passing through the rotor plane affect the blades unequally. Mass imbalance can occur when the mass of the blades are affected, for example if the mass of the blades are different at installation, or due to water accumulation in the interior of the blades.

The tower will oscillate in accordance with its natural frequency or 'eigenfrequency' which is determined largely by structural features of the wind turbine such as such as its height, diameter, material of fabrication, nacelle mass to name a few factors. Typically, a wind turbine will be designed such that the eigenfrequency of the tower is spaced, in the frequency domain, from the operational speed range of the rotor and associated generating equipment. However, this design principle means that the influence of rotor imbalance on the tower is difficult to detect and quantify, the result being that important components of the system, such as the rotor bearings, generating equipment and the like are subject to unbalanced forces that can have a detrimental impact on their service life.

Some efforts have been made to diagnose rotor imbalance for wind turbines. In one study, as documented in "Caselitz, P., Giebhardt, J.: Rotor Condition Monitoring for Improved Operational Safety of Offshore Wind Energy Converters. ASME Journal of Solar Energy Engineering 2005, 127, p 253-261", a statistical approach is taken to diagnose a mass imbalance between the blades of a wind turbine. In particular, this approach applies a 'learning phase' over a significant time period (presented as three months) during which the system monitors the power output and wind speed conditions in order to define a power characteristic for a 'faultless' rotor. Further measurements are then taken to identify any departure from the 'faultless' characteristic in order to identify that a problem exists with the rotor. Instrumentation in the form of nacelle-mounted accelerometers then provide data which is analysed to determine if a mass imbalance exists between the blades of the rotor. Although such a scheme appears to provide an approach which offers the potential to diagnose blade imbalance conditions, in practice it is impractical due to the need for the learning phase to characterise a 'faultless' rotor, and due to its reliance on the assumption that the rotor as installed will indeed be faultless.

It is against this background that the invention has been devised.

SUMMARY OF THE INVENTION

In a first aspect, the invention provides a wind turbine comprising a tower, a rotor including a plurality of blades, an electrical generator operatively coupled to the rotor, and a control system including an active damping module configured to monitor oscillatory motion of the wind turbine and to output a damping demand signal to damp the oscillatory motion. The control system is configured to perform a rotor imbalance determination process including:
  controlling the rotating frequency of the rotor so that it substantially coincides with the natural frequency of the tower,
  determining rotor imbalance data based on the damping demand signal and evaluating said rotor imbalance data to determine the presence of a rotor imbalance condition, and
  correcting the rotor imbalance condition by applying pitch control inputs to one or more of the plurality of blades so as to reduce the severity of the rotor imbalance.

The invention may also be expressed as, and therefore also embraces, a method of operating a wind turbine, the wind turbine including a tower and a rotor having a plurality of blades attached thereto, and an active damping system configured to damp oscillatory motion of the wind turbine. The method comprises:
  controlling the rotating frequency of the rotor so that it substantially coincides with the natural frequency of the tower,
  determining rotor imbalance data based on a damping demand signal associated with the active damping system, and evaluating said rotor imbalance data to determine the presence of a rotor imbalance condition, and
  correcting the rotor imbalance condition by applying a pitch control inputs to one or more of the plurality of blades so as to reduce the severity of the rotor imbalance.

The invention therefore provides a wind turbine with the facility to diagnose and correct a rotor imbalance condition in a convenient manner since it makes use instrumentation that exists on the wind turbine for other purposes. For example the damping signal is used by the damping system of the wind turbine to address oscillations of the tower and nacelle during operation and the pitch control inputs are implemented through existing pitch control motors associated with the blades.

The oscillatory motion of the wind turbine may be tower oscillations, both in the form of fore-apt oscillations, i.e. oscillations in the plane of the main shaft, as well as sideways oscillations, i.e. oscillations in the plane perpendicular to the main shaft.

Tower oscillations, and therefore the required tower damping, are typically larger when the rotating frequency of the rotor is near to the tower natural frequency. In these conditions, the oscillations of the tower due to the rotor imbalance are larger compared with other influences. Therefore, the determination of rotor imbalance data occurs while the rotating frequency of the rotor substantially coincides with the tower natural frequency. It is envisaged that the accurate data will be acquired if data acquisition occurs when the rotating frequency of the rotor is within +/−10% of the tower natural frequency, but more preferably within +/−5% of the tower natural frequency.

In one embodiment, the correction of the rotor imbalance condition comprises an iterative process including the following steps:
  i) calculating a rotor imbalance data set,
  ii) evaluating said rotor imbalance data set to determine the presence of a rotor imbalance condition,
  iii) correcting the rotor imbalance condition,
  iv) repeating steps 1) to iii) whilst a rotor imbalance condition is determined to exist.

In an alternative embodiment, correction of the rotor imbalance condition involves calculating the rotor imbalance correspond to a plurality of pitch offset point of the rotor and then picking the optimal pitch offset to apply to the rotor. More specifically the process comprises:
  i) calculating a plurality of rotor imbalance data sets for a corresponding plurality of pitch offset points associated with the rotor;
  ii) evaluating each of the plurality of rotor imbalance data sets to determine the severity of the rotor imbalance;
  iii) selecting the pitch offset point corresponding to the rotor imbalance data set having the optimal rotor imbalance magnitude;
  iv) applying pitch correction to a respective one or more of the plurality of blades based on the selected pitch offset point.

The pitch offset points may relate to a range of pitch offset angles for each of an adjacent pair of blades and, in the illustrated embodiment, are a sequence of a plurality of pitch angle increments spanning a predetermined pitch sweep around an initial pitch angle for each of the adjacent pair of blades.

Various approaches may be adopted for scheduling the process. For example, the rotor imbalance determination process may be triggered by the receipt of a triggering stimulus external to the control system. Alternatively, the rotor imbalance determination process may be triggered to be performed on a predetermined schedule governed by the control system.

BRIEF DESCRIPTION OF THE DRAWINGS

FIGS. 5a and 5b are plots showing data collection results during the process of FIG. 2; and FIG. 6 depicts an example of a blade pitch sweeping procedure as shown in the process of FIG. 4.

DESCRIPTION OF EMBODIMENTS OF THE INVENTION

It is an aim of the invention to provide the facility to determine whether a rotor imbalance condition exists and, furthermore, to apply corrective inputs to reduce the magnitude of the determined rotor imbalance.

Figure 1:
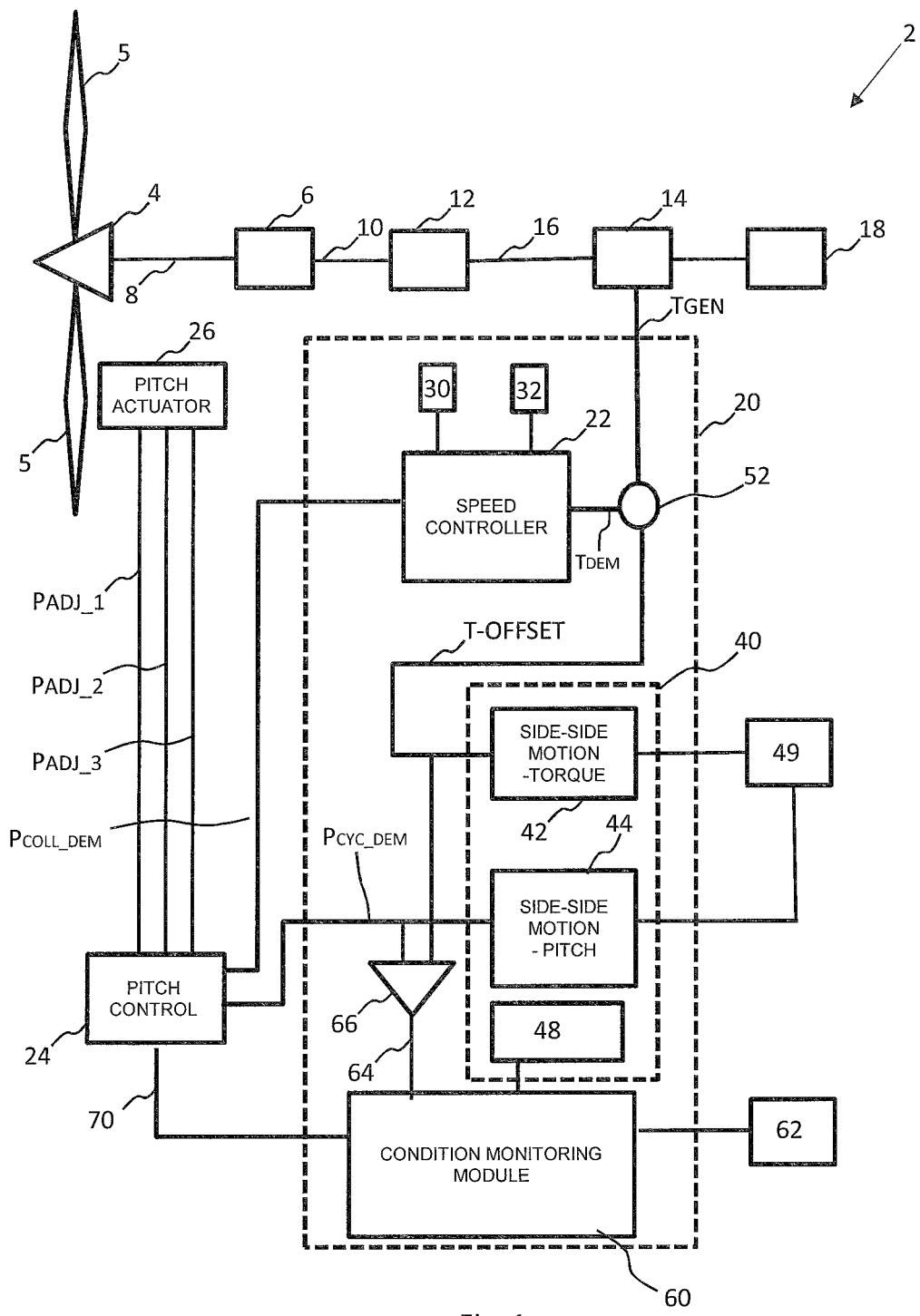
FIG. 1 is a schematic view of a wind turbine system.

FIG. 1 illustrates an example of a technical architecture which gives the invention context. Represented schematically as a system diagram the wind turbine or 'wind turbine system' 2 includes features that are significant for this discussion, but it should be appreciated that many other conventional features that are common to wind turbines are not shown here for brevity, for example the nacelle, tower, control network, power distribution network and so on. However, the skilled person would understand that these features are implicit. Also it should be noted that the specific architecture of the wind turbine system is as an example only so as to illustrate the technical functionality of the invention, and so the invention may be implemented by a system having a different specific architecture.

The wind turbine system 2 includes a rotor 4 having a set of blades 5 which drives a gearbox 6 by way of an input shaft 8. The rotor 4 is a three bladed rotor in this embodiment, but other blade numbers are known. Note that although a gearbox 6 is shown here, it is also known for wind turbines to have a direct-drive architecture which do not include a gearbox. The gearbox 6 has an output shaft 10 which drives a generator 12 for generating electrical power. Three phase electrical power generation is usual in utility scale wind turbine systems, but this is not essential for the purpose of this discussion.

The generator 12 is connected to a frequency converter 14 by a suitable three-phase electrical connector such as a cable or bus 16. The frequency converter 14 is of conventional architecture and, as is known, converts the output frequency of the generator 12 to a voltage level and frequency that is suitable for supplying to the grid 18. Various frequency converter architectures are known in the art and the particular type selected is not central to the invention and so will not be described here in detail.

Although fixed-speed wind turbines are appropriate for wind turbines having a comparatively low power output, for example of below 1 MW, in this embodiment the wind turbine system 2 is able to operate at variable speed so as to be more efficient at capturing energy from the wind at a wind range of wind speeds. The invention is, however, also suitable for use in a fixed-speed wind turbine.

As is known, variable-speed wind turbines typically operate under two main control strategies: below-rated power and above-rated power. As is known, the term 'rated power' is used here in its accepted sense to mean the power output at which the wind turbine system is rated or certified to produce under continuous operation. Similarly, the use of the term 'rated wind speed' should be understood to mean the lowest wind speed at which the rated power of a wind turbine is produced.

Below rated power occurs at wind speeds between the cut-in speed and rated wind speed which, typically, is between 10 and 17 m/s. In this operating region, the wind turbine system 2 is operable to control the rotor speed so as to maximise the energy captured form the wind. This is achieved by controlling the rotor speed so that the tip speed ratio is at an optimum value, namely between 6 and 7. To control the rotor speed, the wind turbine system 2 is provided the facility to control the generator torque so as to track a power reference, as will be described.

Above-rated power occurs when the wind speed has increased to, or has exceeded, the rated wind speed. In this operating condition, the objective of the wind turbine system 2 is to maintain a constant output power. This is achieved by controlling the generator torque to be substantially constant, so as to track a constant power reference, but varying the pitch angle of the blades which adjusts the resulting lift and drag force of the blade in the rotor plane. This will slow down the turbine's rotational speed or the torque transferred to the rotor shaft so that the rotational speed, and also the generated power of the system, is kept constant below a set threshold.

Referring again to FIG. 1, in order to achieve the below-rated power and above-rated power control objectives, the wind turbine system 2 is equipped with a control system 20. The control system 20 includes a speed controller 22 which is operable to control the frequency converter 14 to influence the torque exerted on the rotor 4 by the generator 12, and also to control the pitch of the blades 5 through a blade pitch adjustment system comprising a pitch control module 24 and a pitch actuation module 26.

It should be noted at this point that the architecture of a wind turbine speed control system that acts through power electronics such as a frequency converter to control generator power, and thereby the reaction torque on the rotor via the gearbox 6, and also acts through a pitch control system to control the pitch angle of the blades is generally known in the art, so a detailed description of the electronic architecture will not be given here.

The speed controller 22 receives a plurality of control inputs, but two input parameters are shown specifically here: a rotor speed input parameter 30 which is provided by a suitable rotor speed sensing means, and a demanded power input parameter 32 or 'power reference' which is provided by a higher level controller (not shown) of the wind turbine system 2 either directly to the speed controller 22 or through a data distribution network based on a suitable protocol, such as ethernet.

The speed controller 22 is operable to control the generator torque, which is associated with, and calculated from, the power reference, by outputting a demanded torque signal $T_{DEM}$ to the frequency converter 14 during below-rated power operating condition in order to minimise the error between the rotor speed input parameter 30 and the speed reference 32 and, therefore, to track the power reference. Similarly, at operating conditions above-rated power, the speed controller 22 is operable to hold the generator torque constant (and, therefore to track the constant power reference) but to provide a control input to the pitch control module 24 to modulate, collectively, the pitch angles of all three blades 5 of the rotor 4. The pitch control module 24 receives the control input from the speed controller, shown here as $P_{COLL\_DEM}$ and converts this into a pitch angle adjustment value for each of the blades 5. The pitch angle adjustment signals are shown here as $P_{ADJ\_1}$ $P_{ADJ\_3}$ and $P_{ADJ\_3}$ that represent values for a three bladed rotor. These control inputs are fed to the pitch actuation module 26 which controls the pitch actuating motors for the respective blades 5.

As will be appreciated from the above discussion, the wind turbine system 2 is provided with a facility to control the rotor speed during a wide range of wind speeds in order to optimise the power generation of the system. However, in addition to this speed control facility, the wind turbine system 2 also is provided with a facility to control the way in which the tower oscillates in use. To this end the control system 20 includes a damping controller 40 which cooperates with the speed controller 22, as will be explained, in order to apply forces into the rotor 4 via the generator 14 and the blade pitch adjustment system in order to counter the oscillation of the tower. Advantageously, the damping controller 40 may be operable substantially continuously during operation of the wind turbine, or its operation may be selected during certain operating conditions.

Referring still to FIG. 1, the damping controller or 'system' 40 includes two main control modules, which are a lateral (side-side) motion torque damping module 42, and a lateral (side-side) motion pitch damping module 44. At this point it should be noted that although the modules 42, 44, are illustrated as separate, this is not intended to confer a particular physical structure on the modules. For example, the modules may be separate firmware units or they may be individual functional software units implemented on a common processing platform. Also it should be noted that the lateral motion torque damping module 42 and the lateral motion pitch damping module 44 may be operated simultaneously, it is more appropriate for them to be operated separately. For instance, the lateral motion torque damping module 42 tends to be more effective when operating at partial load conditions, that is to say at below rated power, whilst the lateral motion pitch damping module 44 tends to be more effective when operating at full load conditions, that is to at or above rated power.

The lateral motion torque damping module 42 receives as an input signal a lateral acceleration parameter 49 which may be sourced from a suitable sensor or sensors installed on the wind turbine, for example on the tower or nacelle. The sensor may be any suitable sensor, such as an acceleration sensor or other type of sensor capable of determining an oscillatory motion of the tower. In order to detect the oscillatory movement of the tower, the acceleration sensor should have sensitivity at low frequencies, for example in the range of 0.5 Hz. Any sensor is suitable provided that it is able to sense acceleration at tower oscillatory frequencies which tend to be in the region of 0.1 to 0.5 Hz in large-scale turbines. Higher frequencies that are not of interest can be filtered out. In response to the input signal, the lateral motion torque damping module 42 is operable to output a damping demand signal, that is illustrated here as a power/torque offset signal $T_{OFFSET}$ which serves to modulate the output of the speed controller 22 at summing junction 52. The modulated signal is coupled to the frequency converter 14, via a generated torque signal $T_{GEN}$, which controls the generator 12 accordingly.

The lateral motion pitch damping module 44 is operable particularly during above-rated power operating conditions and operates via the pitch control module 24 to control the pitch adjustment commands for the blades 5, as will now be explained. The lateral motion pitch damping module 44 functions to damp the oscillations of the tower in a direction that is transverse to the rotor axis; that is to say the 'side-to-side' motion of the tower. To do this, it receives as input signal the lateral acceleration parameter 49 from the acceleration sensor that provides data to the lateral motion torque damping module 42 and then calculates the pitch adjustments needed to each of the blades individually to result in the rotor applying a sideways force that is counter to the sideways motion of the tower. The module 44 outputs a damping demand signal $P_{CYC\_DEM}$ to the pitch control module 24 which represents the pitch change required in respect of the blades on a cyclical basis to as to counteract the oscillations of the tower.

As will be now appreciated from the above discussion, the pitch control module 24 receives the collective pitch demand $P_{COLL\_DEM}$ from the speed controller 22 and also receives the cyclic pitch demand $P_{CYC\_DEM}$ from the lateral motion damping module 44. The pitch control module 24 combines the aforementioned signals and factors the necessary adjustments into the three separate pitch adjustment signals $P_{ADJ\_1}$ $P_{ADJ\_3}$ and $P_{ADJ\_3}$ to the pitch actuation module 26, in order to adjust the pitch angles of each of the blades both collectively and cyclically. The pitch actuation module 26 therefore controls the blades 5 of the wind turbine system 2 in accordance with the adjustments determined by the damping controller 40.

The above discussion has explained the functionality of the active damping facility to modulate the torque/power demand to the generator and also the pitch of the blades. In doing so, the active damping facility is operable to reduce the oscillatory motion of the tower during conditions where damage could occur. This may be during particularly high wind conditions, for example.

In the invention, the operation of the active damping facility is used to enable a diagnosis to be made about whether the rotor is in balance or out of balance, as now referred to as a rotor imbalance condition.

For this purpose the control system 20 includes a condition monitoring module (CMM) 60, which is identified here as a further functional module within the boundary of the control system 20.

In broad terms, the conditioning monitoring module 60 is operable to determine, and also to correct for, a rotor imbalance condition. In doing so, it is granted partial authority over the operation of the active damping system 40, via a connection with a supervisory module 48 of the active damping system 40, as will be explained.

The conditioning monitoring module receives two data signals, or inputs, namely a rotor azimuth signal 62 and a damping demand signal 64.

The rotor azimuth signal 62 is received from a suitable rotational position sensor, such as a rotary encoder, associated with the rotor 4. The signal 62 provides the condition monitoring module 60 with an indication of the angular position of the rotor 4 and, as is known, is usually calibrated to read zero when a reference blade is at a top centre position. The signal will therefore trace a sawtooth waveform as the rotor 4 rotates. Both signals 62, 64 may be direct inputs into the condition monitoring module 60, although it is more likely that they will be transmitted via the control network or data bus.

The damping demand signal 64 is derived from the damping demand signal (cyclic pitch command $P_{CYC\_DEM}$) from the lateral motion pitch damping module 44 and the torque offset damping demand signal ($T_{OFFSET}$) from the lateral motion torque damping module 42. Each of the aforesaid signals are input into a signal combiner 66 and a single damping demand signal 64 is input into the condition monitoring module 60. The demanding demand signal 64 therefore provides an indication as to the magnitude and frequency of the tower oscillation. Under certain operating conditions, it can be assumed that the largest contributor to the tower oscillation is the mass and aerodynamic imbalance of the rotor. Therefore, the condition monitoring module 60 makes use of this information in order to identify, quantify and correct a rotor imbalance condition.

The functionality of the condition monitoring module 60 will now be explained in more detail with reference to FIGS. 2, 3 and 4.

Figure 2:
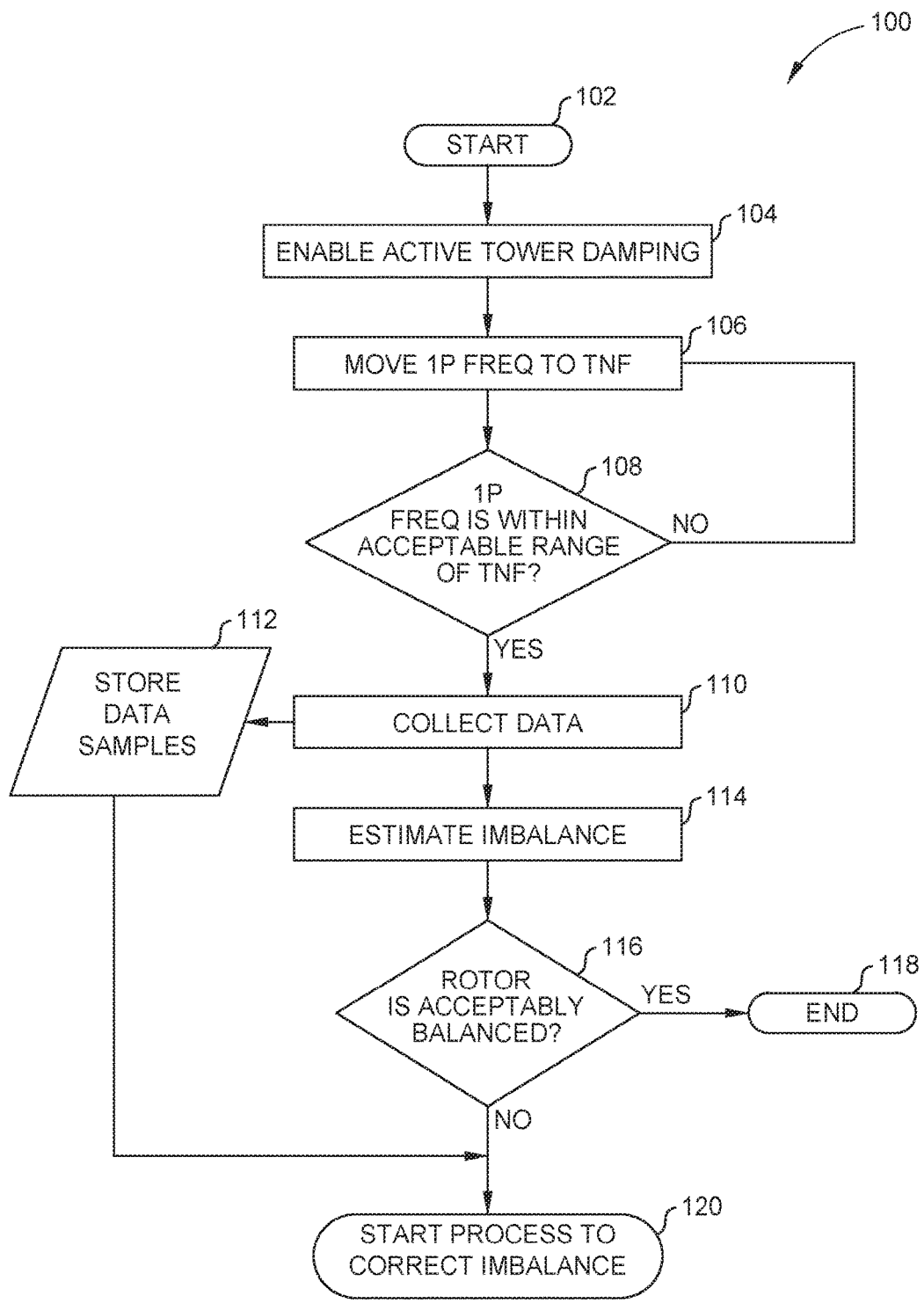
FIG. 2 is a process diagram illustrating a strategy for determining rotor imbalance.

Referring firstly to FIG. 2, a top-level process 100 is implemented by the condition monitoring module 60 at step 102 when it is determined that it is the right time to check whether the rotor imbalance is within acceptable levels. The process 100 may be implemented on a set time schedule, for example once every month, or may only be started when commanded to do so. The process 100 may be triggered by external stimuli, for example the condition monitoring signal may be configured to receive an activation command via a local or remote controller.

At steps 104-108, the process 100 controls the wind turbine system to bring it into a suitable operating condition for the diagnosis of rotor imbalance. Firstly, at step 104, the active tower damping facility is enabled and then, at step 106, the rotor speed is controlled so that it coincides with, (i.e. is within a predetermined speed range of) the fundamental frequency of the tower. Preferably, the rotor speed is controlled so that it is within 20% (+/−20%) of the tower natural frequency, although it is currently envisaged that the rotor speed should be within 10% (+/−10% of the tower natural frequency), and preferably within 5% (+/−5% of the tower natural frequency). Generally, the accuracy of the procedure will be benefited by the rotor speed being controlled so that it is as close to the tower natural frequency as possible. Note that in performing these steps, the CMM 60 may request the supervisory controller 48 to activate the active damping system 40 and may also request the speed controller 22 to shift the operating point of the wind turbine towards the tower natural frequency. In doing so, the speed controller 22 controls the speed of the wind turbine as described above depending on whether the wind turbine is above or below rated conditions.

From step 106, the process loops through decision step 108 until the rotor speed is within an acceptable range of the tower natural frequency (TNF).

Once the rotor speed is within range, that is to say it has been determined that the rotor speed 'coincides' with the tower natural frequency, the process enters a data collection phase at step 110.

In the data collection phase, the condition monitoring module 60 samples the damping demand signal 64 and the rotor azimuth signal 62 over a time period that is sufficient to obtain a stable data set. A sampling rate of approximately 10 Hz is envisaged to be sufficient although this is provided as an example only. It is currently envisaged that a time period of between 2-10 minutes would be sufficient at a substantially constant rotor speed, within a predetermined tolerance, as discussed above. Preferably, the data collection is performed during relatively high wind speed conditions, for example between 12-18 meters per second (ms⁻1) during which conditions the rotor imbalance is dominated by the aerodynamic imbalance of the blades and the mass imbalance may effectively be ignored for the purposes of the calculation.

In this embodiment, the data samples of the damping demand signal 64 are binned with the corresponding azimuth angle signal 62 (0-360°). Bin width may be a single degree, but, in practice, it is envisaged that a bin width of between 5-10° would provide the required resolution. The data samples are stored in a memory storage unit 112. Referring briefly to FIGS. 5*a* and 5*b*, binning of the tower damper signal 64 with respect to azimuth angle signal 62 in this manner yields the relationship shown in the graph of FIG. 5*a*, which represents a rotor with mass/aerodynamic imbalance. The plot on the left shows raw binned data whilst the plot on the right shows the binned data that has been averaged. It can therefore be seen that in the illustrative example shown in FIG. 5*a*, the rotor imbalance varies from a minimum of about −0.65° at an azimuth angle of about 50 degrees to a maximum of about 0.60° at an azimuth angle of about 220 degrees. Compare this with the relationship shown in FIG. 5*b* for a balanced rotor, in which the relationship is much flatter, thereby indicating a more balanced rotor.

Once the data samples have been collected at step 110, the process moves on to step 114 at which point it processes the collected data to estimate a value for the rotor imbalance. If it is determined that the rotor is acceptably balanced i.e. that the rotor balance does not exceed a predetermined threshold, as represented by check step 116, the process terminates at step 118. If, however, it is determined that the rotor imbalance exceeds a predetermined threshold, the process continues to step 120 at which it operates to correct the imbalance, as will be described in more detail later.

Returning to the estimation step 114, there are different methods by which the rotor imbalance may be estimated using the data collected during step 110. One approach is to calculate the absolute range of the damping demand signal after the data has been averaged, as shown in FIG. 5a. Azimuth angle/direction of the imbalance can be determined by evaluating the data to determine at what azimuth angle the damping module demands maximum damping. Referring again to FIG. 5a, the damping signal is at a maximum at an azimuth angle of approximately 230°. Note that the damping signal is at a minimum at an azimuth angle of approximately 50° which, as expected, is 180° out of phase with the positive maximum of the damping signal. Precise correspondence between azimuth angle of the imbalance and the angle at which the damping signal is a maximum can be determined empirically or by way of modelling. In one sense, therefore, it will be understood that the condition monitoring module is operable to analyse the damping signal and to derive from this a fictional pitch offset at a certain azimuth angle that approximates to any combination of pitch imbalance between the blades.

The skilled person may also understand that the magnitude of the imbalance may be determined through other techniques. For example, calculating the standard deviation of the data will provide a relative measure of the magnitude of the imbalance. This technique can be combined with a pitch adjustment process the object of which is to minimise the standard deviation value, thereby minimising the imbalance.

As mentioned above, once the rotor imbalance has been estimated at step 114, and determined to exceed a predetermined threshold representing an acceptable level of imbalance, which in reality may be between 0.1 to 0.5°, the process goes on to correct for the rotor imbalance at step 120. Two alternative approaches to correcting for the rotor imbalance will be now be described, with reference, respectively, to FIG. 3 and FIG. 4.

Figure 3:
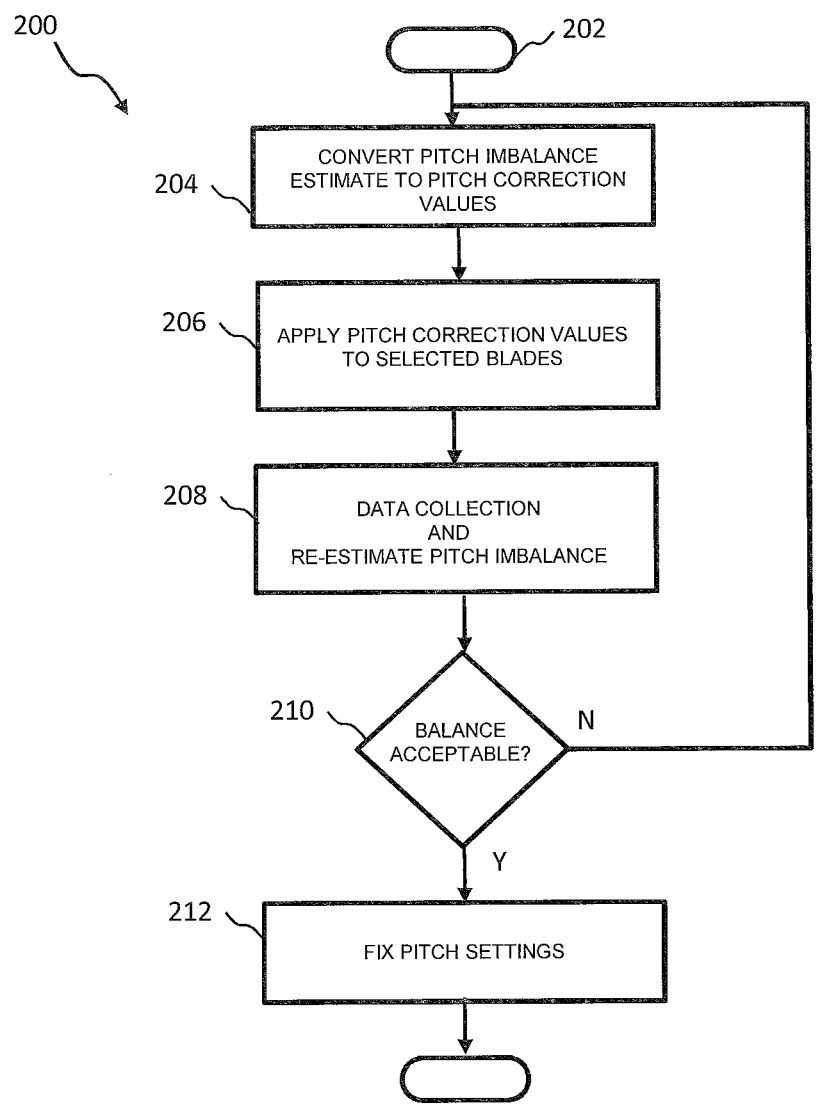
FIG. 3 is a process diagram illustrating an example of a technique for correcting rotor imbalance.

Referring firstly to FIG. 3, a rotor imbalance correction process 200 begins at 202 which represents the process being called by correction step 120 in FIG. 2.

At step 204, the rotor imbalance estimate, as calculated at step 114 in FIG. 2, is converted to a pitch correction parameter. This calculation could be performed in different ways. One way in which it could be performed is by reference to a look up table that stores data that has been determined through modelling or by way of experiments to relate the magnitude of the pitch imbalance between blades to the corrective pitch offset values required on the blades in order to correct the imbalance. Note that, in effect, the pitch imbalance between a pair of blades results in vector force component extending at an angle between the blades. Applying a pitch offset to each of the blades, resolves into a single net force that counters the imbalance force vector.

Once respective pitch offset values have been calculated for a pair of adjacent blades, at step 206 the pitch offset values are applied to the selected blades via the pitch control module 24 which makes appropriate adjustments to the pitch adjustment signals $P_{ADJ\_1}$ $P_{ADJ\_3}$ and $P_{ADJ\_3}$ it sends to the pitch actuation module 26. In FIG. 1 the input signal from the conditioning monitoring module 60 to the pitch control module 24 is shown as reference '70'.

Following the adjustments of the blades, it is necessary to evaluate the effects of the adjustments. To do this, at step 208 the process once again runs through a data collection phase as described above at step 110 in FIG. 2, and then estimates the blade imbalance as described at step 114.

Once the rotor imbalance has been re-calculated, decision step 210 determines that the estimated imbalance is within a predetermined threshold. Such a threshold may be determined in an offline process and provides an indication as to the maximum rotor imbalance that can be tolerated including a safety margin.

If the rotor imbalance is still not acceptable, the process repeats steps 204 to 208 such that new pitch adjustment values are calculated based on the new rotor imbalance value, whereby those pitch adjustment values are applied to the rotor blades and rotor imbalance is again estimated. This process repeats until it is determined that the rotor imbalance is within acceptable limits, at which point the pitch settings are fixed at step 112 and the process terminates. In practice, it is envisaged that the rotor will be balanced within acceptable limits by one or two passes through the correction algorithm.

Figure 4:
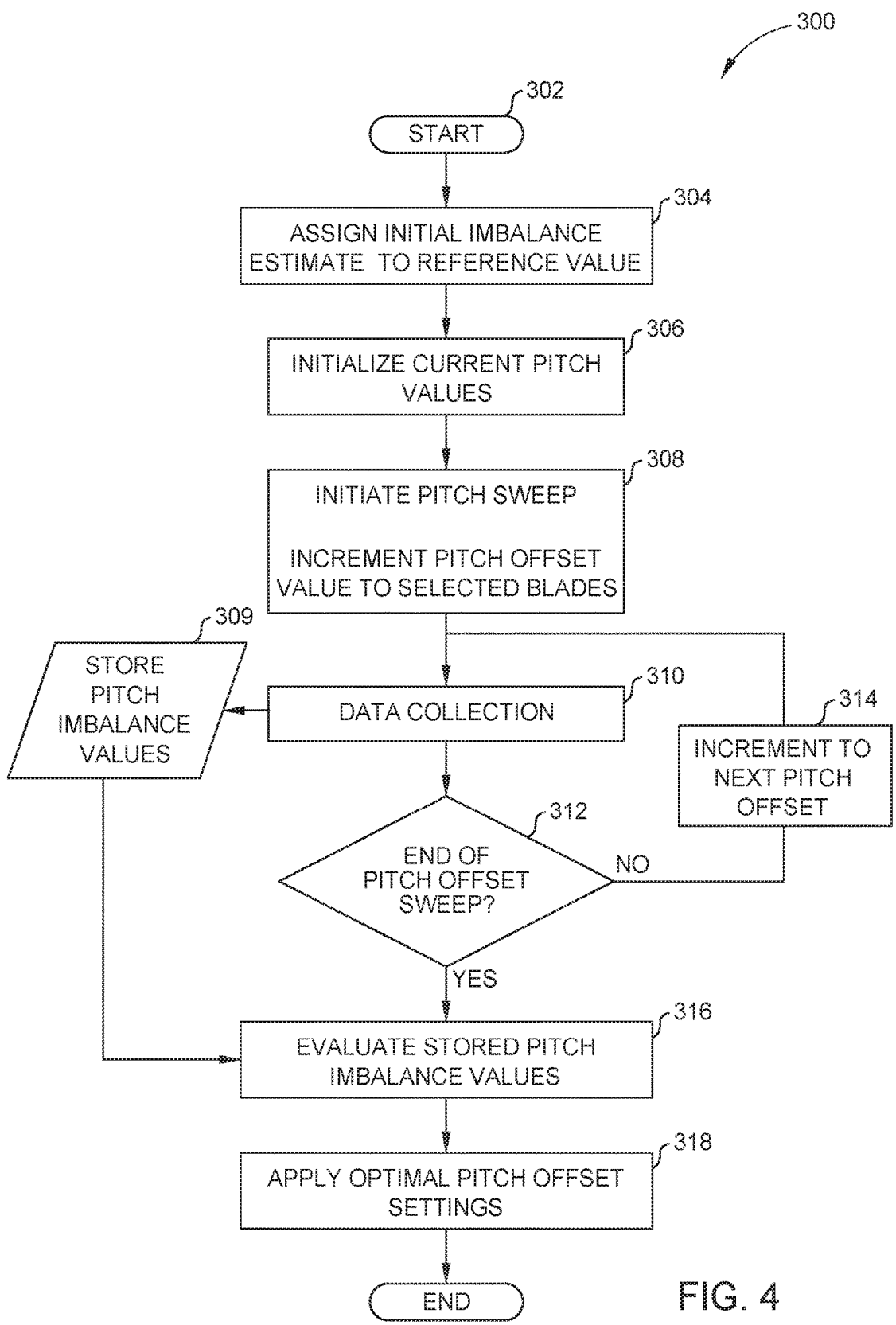
FIG. 4 is a process diagram illustrating another example of a technique for correcting rotor imbalance.

Turning to FIG. 4, an alternative process 300 is shown for correcting rotor imbalance. As in the process 200 in FIG. 3, this alternative process 300 is represented by correction step 120 in FIG. 2.

This alternative correction process 300 involves evaluating the rotor imbalance around a 'sweep' through a plurality of blade pitch offsets relative to the current blade pitch values. In effect, therefore, one or more blades of the rotor are caused to increment through a sequence of pitch offset values during which data is collected about the rotor imbalance associated with each of the pitch increments. Once the data collection has been completed, rotor imbalance values are determined for each pitch offset increment and the optimal pitch offset increment is chosen to apply to the selected blades of the rotor.

In more detail, once the correction process 300 is initiated at step 302, the rotor imbalance value that was estimated at step 114 in FIG. 2 is assigned to a reference value, at step 304, to which later estimated rotor imbalance values can be compared.

Then, at step 306, according to the phase of the rotor imbalance, two blades of the rotor are selected for adjustment and their current pitch values are initialised to zero.

At step 308, the process enters a pitch sweep procedure wherein, for each of the two selected blades, the blade pitch is incremented between a range of pitch offsets around the initialized blade pitch value.

Firstly, a first blade offset increment is selected and applied to the selected blades. It is envisaged that a suitable blade offset increment will be 0.1 degree, although this is provided by way of example only. Once the blades have been adjusted, rotor imbalance data is collected at step 310 in a manner already described in step 110, the rotor imbalance is estimated in a manner as described in step 114, and the data is stored in data store 309.

Once data collection has ended, the process loops through decision step 312 which detects for available pitch offset increments, and step 314 at which the next pitch offset increment is selected. As illustrated in FIG. 6, one scheme for selecting the pitch offset increments is to alternate between increasingly larger positive and negative pitch offset increments about the initialised or 'reference' blade pitch value, marked as 'A' on FIG. 6. Three positive and negative increments are shown here, by way of example, but it should be appreciated that in principle any range of increments may be chosen. In practice, it is envisaged that a maximum for the positive and negative pitch offset increments is 0.6 degrees, in 0.1 degree increments. Alternative 'sweep' schemes are possible. For example, one option would be to increment both blades alternately such that for Blade1/Blade2, the increments would be 0.0/0.1, 0.0/−0.1, −0.1/−0.1, −0.1/0.0, −0.1/0.1; 0.0/0.2, 0.0/−0.2 and so on.

A group of one or more incremental pitch offset values relating to respective blades can be considered to be a 'pitch offset point'.

Once the process has progressed through the full sweep of pitch offset increments, step 316 evaluates the stored rotor imbalance values for each of the pitch offset increments. In doing so it determines which combination of blade pitch offset increments results in the lowest value of rotor imbalance. Once the optimal combination of blade pitch offset increments has been identified, the settings are applied to the appropriate blades at step 318. The process then terminates.

From the above discussion, it will be appreciated that the condition monitoring system 60 uses data sources such as the damping demand signal and the rotor azimuth signal in order to i) diagnose and ii) resolve rotor imbalances. One benefit of this, therefore, is that it does not require significant additional instrumentation of the wind turbine to pick up acceleration signals in various locations as is the case with existing schemes for diagnosing rotor imbalance.

Furthermore, since the process can be run whilst the wind turbine is operating it is not necessary to shut down the installation in order to carry out the rotor imbalance diagnostic process.

Although in the above embodiment, the speed controller 22 is described as providing a demanded torque value to the frequency converter, it is also possible for the speed controller to provide the frequency converter with a demanded power reference, whereby the speed controller would calculate the torque necessary to apply to the gearbox in order to match the energy output to the demanded power reference.

What is claimed is:

1. A wind turbine comprising a tower, a rotor including a plurality of blades, an electrical generator operatively coupled to the rotor, and a control system including an active damping module configured to monitor oscillatory motion of the wind turbine and to output a damping demand signal to damp the oscillatory motion,
    wherein the control system is configured to perform a rotor imbalance determination process including:
    controlling a rotating frequency of the rotor so that it substantially coincides with a natural frequency of the tower,
    determining, while the rotating frequency of the rotor substantially coincides with the natural frequency of the tower, rotor imbalance data based on the damping demand signal and evaluating said rotor imbalance data to determine a presence of a rotor imbalance condition, and
    correcting the rotor imbalance condition by applying one or more pitch control inputs to one or more of the plurality of blades so as to reduce the rotor imbalance condition.

2. The wind turbine of claim 1, wherein the rotating frequency of the rotor is within +/−10% of the natural frequency of the tower.

3. The wind turbine of claim 1, wherein correction of the rotor imbalance condition comprises an iterative process including:
    i) determining a rotor imbalance data set,
    ii) evaluating said rotor imbalance data set to determine the presence of the rotor imbalance condition,
    iii) applying pitch control inputs to one or more of the plurality of blades so as to reduce the rotor imbalance condition,
    iv) repeating steps i) to iii) while the rotor imbalance condition is determined to exist.

4. The wind turbine of claim 3, wherein calculating the rotor imbalance data set includes acquiring the damping demand signal and a rotor azimuth signal over a predetermined data acquisition period.

5. The wind turbine of claim 1, wherein correction of the rotor imbalance condition comprises:
    determining a plurality of rotor imbalance data sets for a corresponding plurality of pitch offset points associated with the rotor;
    evaluating each of the plurality of rotor imbalance data sets to determine the rotor imbalance condition;
    selecting one or more pitch offset points corresponding to the rotor imbalance data set based on a rotor imbalance magnitude; and
    applying pitch correction to a respective one or more of the plurality of blades based on the one or more selected pitch offset points.

6. The wind turbine of claim 5, wherein calculating the plurality of rotor imbalance data sets includes acquiring the damping demand signal and a rotor azimuth signal over a predetermined data acquisition period for each one of the rotor imbalance data sets.

7. The wind turbine of claim 5, wherein the pitch offset points relate to a range of pitch offset angles for each of an adjacent pair of blades.

8. The wind turbine of claim 7, wherein the range of pitch offset points are a sequence of a plurality of pitch angle increments spanning a predetermined pitch sweep around an initial pitch angle for each of the adjacent pair of blades.

9. The wind turbine of claim 1, wherein the rotor imbalance determination process is triggered to be performed on a predetermined schedule governed by the control system.

10. The wind turbine of claim 1, wherein the rotor imbalance determination process is triggered by receiving a triggering stimulus external to the control system.

11. The wind turbine of claim 1, wherein the active damping module is configured to control a blade pitch control module and a generator torque control module.

12. A method of operating a wind turbine, the wind turbine including a tower and a rotor having a plurality of blades attached thereto, and an active damping system configured to damp oscillatory motion of the wind turbine, the method comprising:
    controlling a rotating frequency of the rotor so that it substantially coincides with a natural frequency of the tower,
    determining, while the rotating frequency of the rotor substantially coincides with the natural frequency of the tower, rotor imbalance data based on a damping demand signal associated with the active damping system, and evaluating said rotor imbalance data to determine a presence of a rotor imbalance condition, and correcting the rotor imbalance condition by applying one or more pitch control inputs to one or more of the plurality of blades so as to reduce the rotor imbalance condition.

13. The method of claim 12, wherein correction of the rotor imbalance condition comprises an iterative process including:

i) determining a rotor imbalance data set, ii) evaluating said rotor imbalance data set to determine the presence of the rotor imbalance condition, iii) applying pitch control inputs to one or more of the plurality of blades so as to reduce the rotor imbalance condition, iv) repeating steps i) to iii) while the rotor imbalance condition is determined to exist.

14. The method of claim 12, wherein correction of the rotor imbalance condition comprises:

determining a plurality of rotor imbalance data sets for a corresponding plurality of pitch offset points associated with the rotor;

evaluating each of the plurality of rotor imbalance data sets to determine the rotor imbalance condition;

selecting one or more pitch offset points corresponding to the rotor imbalance data set based on a rotor imbalance magnitude; and applying pitch correction to a respective one or more of the plurality of blades based on the one or more selected pitch offset points.

15. The method of claim 14, wherein the pitch offset points relate to a range of pitch offset angles for each of an adjacent pair of blades.

16. The method of claim 15, wherein the range of pitch offset points are a sequence of a plurality of pitch angle increments spanning a predetermined pitch sweep around an initial pitch angle for each of the adjacent pair of blades.

* * * * *